March 17, 1931. A. FONTANAROSA ET AL 1,796,838
PARACHUTE CONSTRUCTION FOR AEROPLANES
Filed Aug. 9, 1929 2 Sheets-Sheet 1
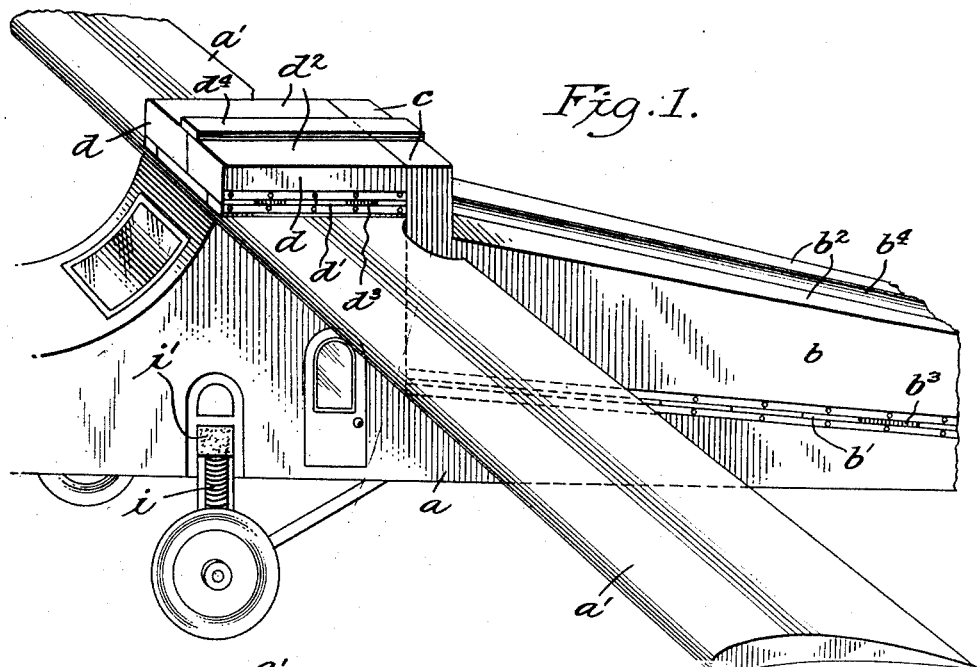
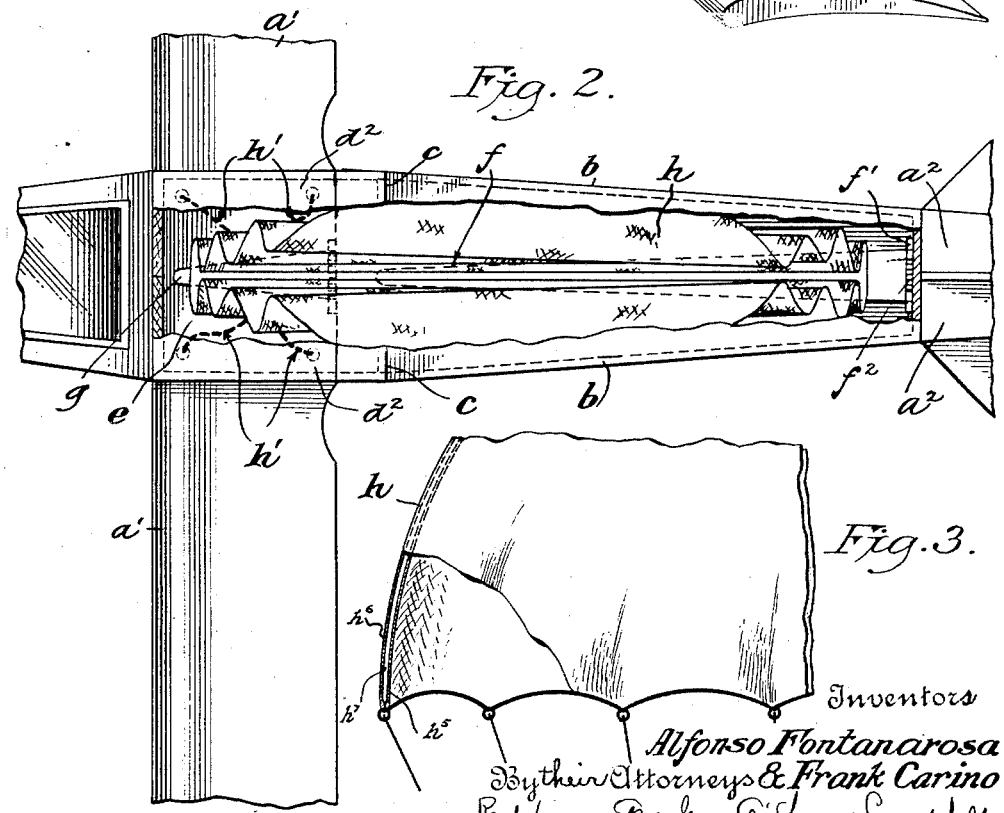
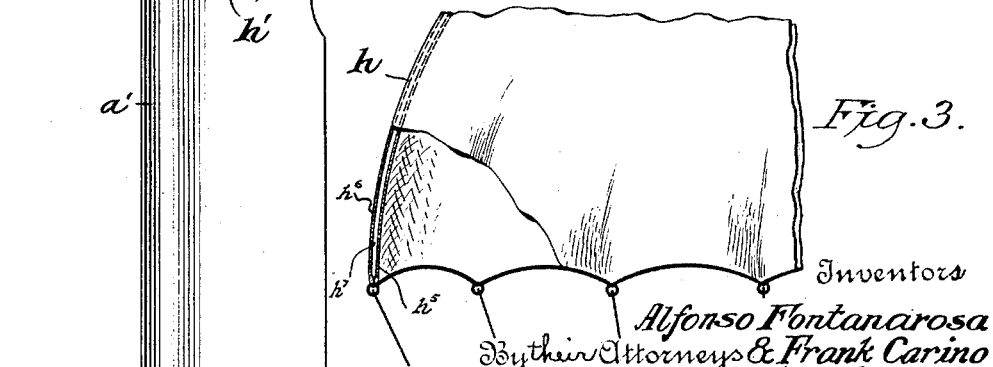
Inventors
Alfonso Fontanarosa
Frank Carino
By their Attorneys
Redding, Greeley, O'Shea & Campbell

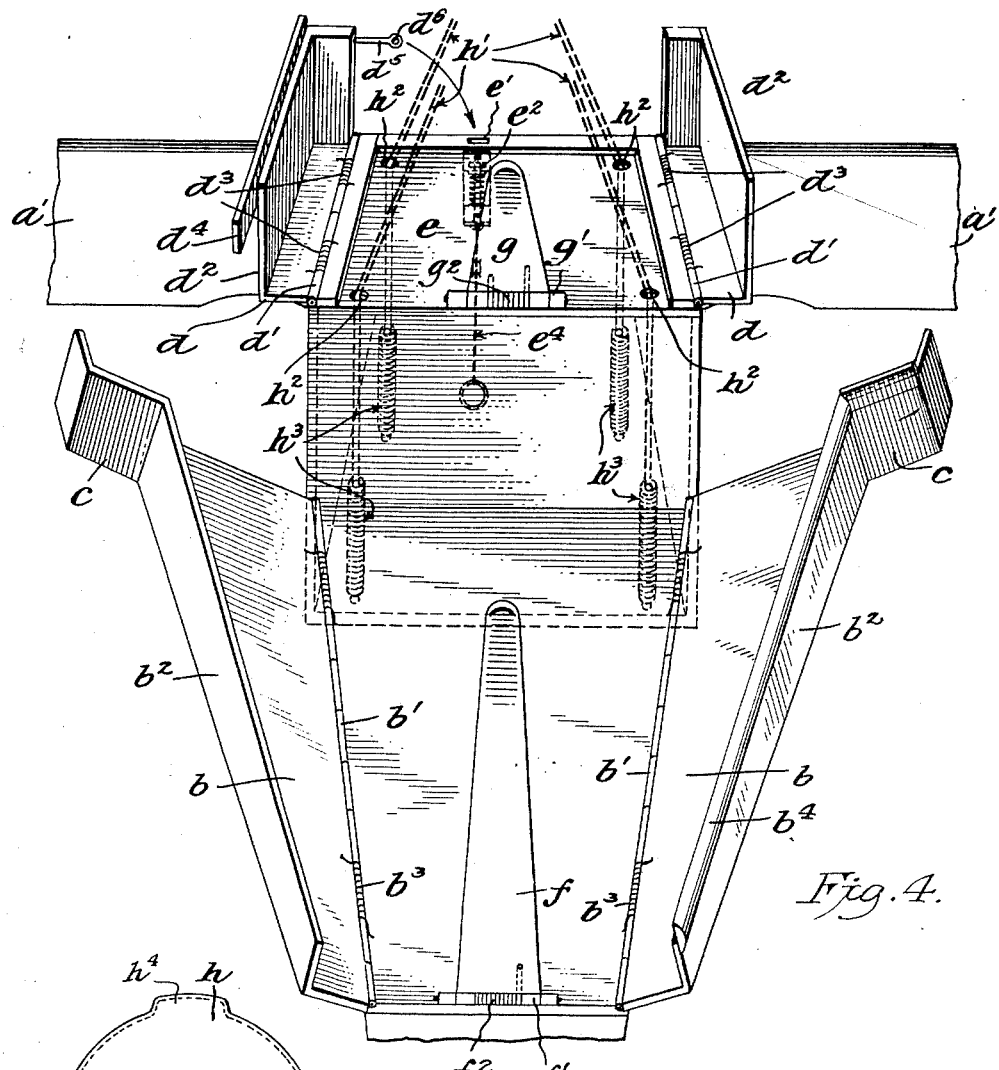
Fig. 4.
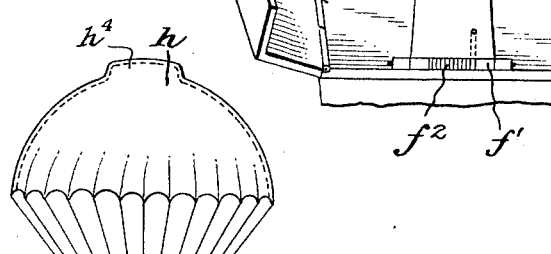
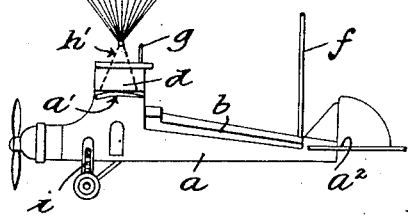
Fig. 5.

Patented Mar. 17, 1931

1,796,838

UNITED STATES PATENT OFFICE

ALFONSO FONTANAROSA AND FRANK CARINO, OF NEW YORK, N. Y.

PARACHUTE CONSTRUCTION FOR AEROPLANES

Application filed August 9, 1929. Serial No. 384,528.

The present invention relates to parachute constructions for aeroplanes and embodies, more specifically, an improved parachute construction and manner of mounting the same upon an aeroplane which insures the unfolding of the chute and dislodging of the securing means upon a predetermined actuation. Considerable effort has been directed toward the provision of a parachute for the plane, the chute functioning to glide the plane gently to earth in the event of its incapacity. The difficulties incident to the designing of such construction are obvious and need not be enumerated herein, and the construction embodied in the present invention serves to overcome the difficulties heretofore experienced.

An object of the invention is to provide a parachute for aeroplanes which effectively opens upon a predetermined operation.

A further object of the invention is to provide a parachute mounting on an aeroplane in such manner that the proper opening of the chute is not hampered when the chute is released for opening.

A further object of the invention is to provide an improved parachute construction.

Further objects, not specifically enumerated above, will be apparent as it is described in greater detail in connection with the accompanying drawings, wherein:

Figure 1 is a perspective view of an aeroplane provided with a parachute and parachute mounting constructed in accordance with the present invention.

Figure 2 is a plan view of the plane shown in Figure 1 with a portion of the cover thereof broken away to show the manner in which the parachute is carried within.

Figure 3 is a segmental view, partly broken away and in section, showing a parachute formed with a gas filled compartment constructed in accordance with the present invention.

Figure 4 is a perspective view looking from the right, as viewed in Figure 1, and showing the parachute container formed on the plane.

Figure 5 is a diagrammatic view showing the manner in which the plane is carried by the chute when the latter is extended and filled.

Referring to the above drawings, $a$ designates the fuselage of an aeroplane provided with wings $a'$. On the upper portion of the fuselage longitudinal doors $b$ are hinged at $b'$. These doors are formed with top portions $b^2$ which overlie the top of the fuselage and form a closure with the top of the fuselage as a fourth side. The longitudinal doors are of sufficient length to enclose a parachute of the required size and, in the present construction, are shown as extending to the tail $a^2$ of the aeroplane.

Upwardly extending hood portions $c$ are formed on the doors and cooperate with the side doors $d$ to form an upper compartment $e$ over the wings of the plane. The doors $d$ are hinged to the wings at $d'$ and are formed with top portions $d^2$ which cooperate with the portions $c$ to form, with the top of the wings, the compartemnt $e$.

Suitable springs $b^3$ and $d^3$ normally urge the doors in the position shown in Figure 4, and beads $b^4$ and $d^4$ provide weathertight joints between the abutting edges of the top portions $b^2$ and $d^2$ of the respective pairs of doors. The bead $d^4$ extends rearwardly over the tops of the upwardly extending portions $c$ and, when the doors $b$ are first closed and the doors $d$ thereafter closed, this bead serves to retain the former in their closed position. This is clearly shown in Figure 1.

A recess $e'$ is formed in the bottom wall of the compartment $e$ and a downwardly extending arm $d^5$ on the left hand door $d$ is adapted to extend into such recess when the left hand door $d$ is closed. A spring pressed detent $e^2$ normally engages an aperture $d^6$ in the arm $d^5$ and latches the doors in their closed position. The spring pressed detent $e^2$ is connected with a pull cord $e^4$ for releasing the detent from the aperture $d^6$, and permitting the doors to spring open.

Within the compartment defined by the doors $b$, a tapered stick $f$ is hinged at $f'$. A spring $f^2$ normally urges the stick upwardly into a vertical position. Within the compartment $e$, a similarly formed arm $g$ is hinged at $g'$ and provided with a spring $g^2$ which normally urges the arm $g$ into a vertical position. A parachute $h$ is folded and laid flat upon the sticks in such manner that the chute will be thrown bodily upwardly and outwardly, thus facilitating the filling thereof, as clearly shown in Figure 2, and when the doors $b$ and $d$ are released, the sticks $f$ and $g$ spring upwardly and unfurl the parachute in order that it may fill properly. The parachute $h$ is permanently attached to the plane through four chains or cords $h'$ which extend through apertures $h^2$ in the lower wall of the compartment $e$ and are connected to the frame structure through retractile springs $h^3$, the latter serving to cushion the shocks upon the frame when the parachute is unfurled and filled. A pocket $h^4$ is formed in the chute to increase its capacity.

The parachute itself is of improved construction and consists of an inner and outer wall $h^5$ and $h^6$, respectively, of airtight material. The space between these walls forms a gas compartment $h^7$ and is filled with any gas of a density designed to increase the buoyancy thereof appreciably, in this manner, combining the characteristics of a balloon with that of a parachute. It is preferred that the wheels of the landing gear be mounted upon the frame through suitable springs $i$ and blocks of rubber $i'$ in order to cushion the impact of the plane with the earth when the parachute glides gently down to rest.

While the invention has been described in connection with the specific construction shown in the accompanying drawings, it is not to be limited, save as defined in the appended claims.

I claim as my invention:

1. A parachute construction for an aeroplane, comprising a plurality of doors forming a compartment over the fuselage, a beading on one of the doors and overlapping the other to hold the latter closed, upward extensions on the doors, a plurality of doors forming a compartment over the wings and communicating with the extensions of the first doors, springs normally urging all of the doors open, a beading over one of the last named doors overlapping one of the first doors to hold all of the doors closed, a tapered stick hinged in the compartment for receiving a parachute, a parachute on the stick, means to urge the stick upwardly, apertures in the base of the compartment over the wings, and cords extending through the apertures and securing the parachute to the frame of the aeroplane.

2. A parachute construction for an aeroplane, comprising a plurality of doors forming a compartment over the fuselage, a beading on one of the doors and overlapping the other to hold the latter closed, upward extensions on the doors, a plurality of doors forming a compartment over the wings and communicating with the extension of the first doors, springs normally urging all of the doors open, a beading over one of the last named doors overlapping one of the first doors to hold all of the doors closed, a tapered stick hinged in the compartment for receiving a parachute, a parachute on the stick and means to urge the stick upwardly.

3. A parachute construction for an aeroplane, comprising a plurality of doors forming a compartment over the fuselage, a plurality of doors forming a compartment over the wings and communicating with the first compartment, springs normally urging the doors to an open position, means to maintain the doors closed, a tapered stick hinged in the compartment for receiving a parachute, a parachute on the stick and means to urge the stick upwardly.

This specification signed this 1st day of August, A. D. 1929.

ALFONSO FONTANAROSA.
FRANK CARINO.